United States Patent [19]
Ohtake et al.

[11] Patent Number: 5,528,428
[45] Date of Patent: Jun. 18, 1996

[54] COMPACT WIDE-ANGLE OBJECTIVE LENS

[75] Inventors: Motoyuki Ohtake, Ohmiya; Motohisa Mori, Yokohama, both of Japan

[73] Assignee: Nikon Corporation, Tokyo, Japan

[21] Appl. No.: 173,084

[22] Filed: Dec. 27, 1993

Related U.S. Application Data

[63] Continuation-in-part of Ser. No. 80,971, Jun. 24, 1993, abandoned, which is a continuation of Ser. No. 973,614, Nov. 9, 1992, abandoned.

[30] Foreign Application Priority Data

Nov. 13, 1991 [JP] Japan .................................. 3-297444
May 13, 1993 [JP] Japan .................................. 5-111289

[51] Int. Cl.$^6$ ............................. G02B 15/14; G02B 9/00
[52] U.S. Cl. .......................... 359/684; 359/691; 359/740; 359/770
[58] Field of Search .................................. 359/740, 746, 359/770, 684, 691

[56] References Cited

FOREIGN PATENT DOCUMENTS 54-70826 6/1979 Japan .
0279815 12/1986 Japan .................................. 359/740

Primary Examiner—George Y. Epps
Assistant Examiner—Evelyn A. Lester
Attorney, Agent, or Firm—Shapiro and Shapiro

[57] ABSTRACT

A wide-angle objective lens is comprised, from the object side, of a first lens component which is a negative meniscus lens having its convex surface facing the object side, a second lens component which is a meniscus lens having its convex surface facing the object side and having positive refractive power, a third lens component which is a cemented meniscus lens comprising a positive lens and a negative lens cemented together and having its convex surface facing the object side and having positive refractive power, a fourth lens component which is a positive meniscus lens having its concave surface facing the object side, and a fifth lens component which is a negative meniscus lens having its concave surface facing the object side. The wide-angle objective lens has a stop disposed between the second lens component and third lens component, and satisfies predetermined conditions.

22 Claims, 10 Drawing Sheets

1

COMPACT WIDE-ANGLE OBJECTIVE LENS

This is a continuation-in-part of application Ser. No. 080,971 filed Jun. 24, 1993, which is a continuation of application Ser. No. 973,614 filed Nov. 9, 1992, both now abandoned.

BACKGROUND OF THE INVENTION

1. Field of the Invention

This invention relates to a wide-angle objective lens for cameras, and particularly to a compact, large aperture, wide-angle objective lens suitable for use in a 35 mm format lens shutter camera or a 35 mm format camera with a range finder.

2. Related Background Art

Biogon type, abiogon type, etc. are known as symmetrical type wide-angle lenses having a negative, positive, negative refractive power distribution. The biogon type wide-angle lens can cover a wide angle of view and can make distortion small. Also, its refractive power distribution is a negative, positive, negative refractive power distribution and therefore, as compared with a symmetrical type wide-angle lens of a positive, negative, positive refractive power distribution such as a topogon type wide-angle lens, the biogon type wide-angle lens has an advantage that the quantity of marginal light is great and moreover the diameters of fore and rear lenses can be made small.

Various wide-angle lenses of negative, positive, negative construction are known as the developed types of the biogon type wide-angle lens. They are known, for example, from Japanese Utility Model Publication No. 43-30782, U.S. Pat. No. 3,829,198, U.S. Pat. No. 4,211,472, Japanese Laid-Open Patent Application No. 56-140311, etc.

Examples in which the F-number is made small are shown in Japanese Utility Model Publication No. 43-30782 and U.S. Pat. No. 4,211,472 and examples which comprise a small number of lens components are shown in U.S. Pat. No. 3,829,198 and Japanese Laid-Open Patent Application No. 56-140311.

However, the biogon type wide-angle lens generally suffers from the disadvantages that the total thickness of the lens system (the thickness from that surface of the lens which is most adjacent (nearest) to the object side to that surface of the lens which is most adjacent to the image side) is great and that the F-number is large.

In the lens systems shown in U.S. Pat. No. 3,829,198 and Japanese Laid-Open Patent Application No. 56-140311, the number of lens components is small but the correction of spherical aberration is deficient and therefore, the F-number cannot provide a large aperture. They also have suffered from the disadvantages that the total thickness of the lens system is very great and that the spacing between the front unit and the rear unit of the lens system in which a diaphragm is placed is too narrow and therefore great limitations must be imposed upon the structure of an aperture stop, a shutter unit, a lens barrel, etc.

In the lens system shown in Japanese Utility Model Publication No. 43-30782, the total thickness of the lens system is very great. Moreover the diameters of the fore and rear lenses are great. This is against the desire to make the lens system compact. In the lens system shown in U.S. Pat. No. 4,211,472, the F-number provides a large aperture but the total thickness of the lens system is great, and this is against the desire to make the lens compact. Also, the shape of coma is bad and therefore, if the lens system is left in its original condition, it is necessary to apply a limitation to the light beam and the quantity of marginal light becomes very small, and this has not been preferable.

Further, in the lens system of Japanese Laid-Open Patent Application No. 54-70826, the symmetry of the refractive power distributions on both sides of a stop is destroyed, the air space between a negative lens component disposed on the object side and a positive lens component and the air space between the positive lens component and a negative lens component disposed on the image side are both are widened, and a wide-angle of view and a large aperture can be obtained. However, this lens system has the disadvantages that the great air spaces result in a great total thickness of the lens system and that the height of a ray of light passing through the lens component remote from the stop becomes far from the optical axis and therefore the effective diameter of each lens becomes large.

Further, Gaussian type, Topogon type, etc. are known as symmetrical type lenses having positive, negative, positive refractive power distribution.

The positive, negative, positive symmetrical type lens is advantageous for large aperture, but cannot cover a wide-angle of view, and conversely, the aforedescribed negative, positive, negative symmetrical lens can cover a wide-angle of view, but has the disadvantage for large aperture.

In the positive, negative, positive symmetrical type lens, the off-axis light beam passing through the lens component remote from the stop passes a location remote from the optical axis and therefore, when an attempt is made to achieve a wide-angle, the effective diameters of the front and rear lenses become large, and this results in the bulkiness of the optical system. Accordingly, when an attempt is made to achieve a wide-angle, a negative, positive, negative symmetrical type lens is desirable.

Thus, it has been difficult to provide an optical system which satisfies the condition that a wide-angle can be achieved by a symmetrical type lens and the optical system is compact with a large aperture. The positive, negative, positive symmetrical type lens and the negative, positive, negative symmetrical type lens are generally of a construction advantageous in the correction of distortion and chromatic aberration. When in such symmetrical type lenses, the whole lens system is axially moved to effect focusing (so-called whole axial movement system), the fluctuation of off-axis aberration can be suppressed to a certain degree.

However, where the whole axial movement system is used in the optical system as disclosed in Japanese Laid-Open Patent Application No. 54-170826 wherein the symmetry of the refractive power arrangement of the negative, positive, negative symmetrical type lens is greatly destroyed in order to make the optical system bright, there has been a problem that the fluctuation of off-axis aberration becomes great.

SUMMARY OF THE INVENTION

Accordingly, it is an object of the present invention to solve the above-noted problems peculiar to the prior art and to provide a symmetrical type wide-angle lens which realizes the small total thickness and great aperture of the lens system and which is compact and bright as well as small in distortion.

To achieve the above object, a wide-angle objective lens according to the present invention comprises, in succession from the object side, a first lens component comprising a negative meniscus single lens having its convex surface facing the object side, a meniscus-shaped second lens component having its convex surface facing the object side and having positive refractive power, a stop, a third lens component comprising a cemented meniscus lens comprising a positive lens and a negative lens cemented together and having its convex surface facing the object side and having positive refractive power, a fourth lens component comprising a positive meniscus single lens having its concave surface facing the object side, and a fifth lens component comprising a negative meniscus single lens having its concave surface facing the object side, and is constructed into a negative, positive, negative refractive power arrangement as a whole, and when the focal length of said first lens component is $f_1$ and the focal length of said fifth lens component is $f_5$ and the radius of curvature of that surface of said third lens component which is most adjacent to the image side is $r_{32}$ and the radius of curvature of that surface of said fourth lens component which is most adjacent to the object side is $r_{41}$, said wide-angle objective lens is designed to satisfy at least one of the following conditions:

$$0.02 \leq |t_1/f_1| \leq 0.1$$

$$0.01 \leq |t_4/f_5| \leq 0.08$$

$$-0.85 \leq (r_{32}+r_{41})/(r_{32}-r_{41}) \leq 0.90,$$

where $t_1$: the air space on the optical axis from that surface of the first lens component which is most adjacent to the image side to that surface of the second lens component which is most adjacent to the object side, $t_4$: the air space on the optical axis from that surface of the fourth lens component which is most adjacent to the image side to that surface of the fifth lens component which is most adjacent to the object side.

By constructing the objective lens as described above, it becomes possible to correct, in particular curvature of image field, astigmatism and coma, and a wide-angle lens which is compact, large aperture and high in performance can be realized.

It is a further object of the present invention to provide a wide-angle lens which suffers little from the fluctuation of off-axis aberration caused by focusing and which is compact with a large aperture and covers a wide-angle of view.

To achieve the above object, the present invention has a stop, and a first lens unit and a second lens unit that are disposed on the object side of the stop and on the image side of the stop respectively. The first lens unit and the second lens unit are designed such that, during focusing, the first and second lens units are moved on the optical axis toward the object side and the amounts of movement of the lens units on the optical axis differ from each other.

Other objects, features and effects of the present invention will become fully apparent from the following detailed description of the invention taken in conjunction with the accompanying drawings.

DETAILED DESCRIPTION OF THE PREFERRED EMBODIMENTS

Figure 1:
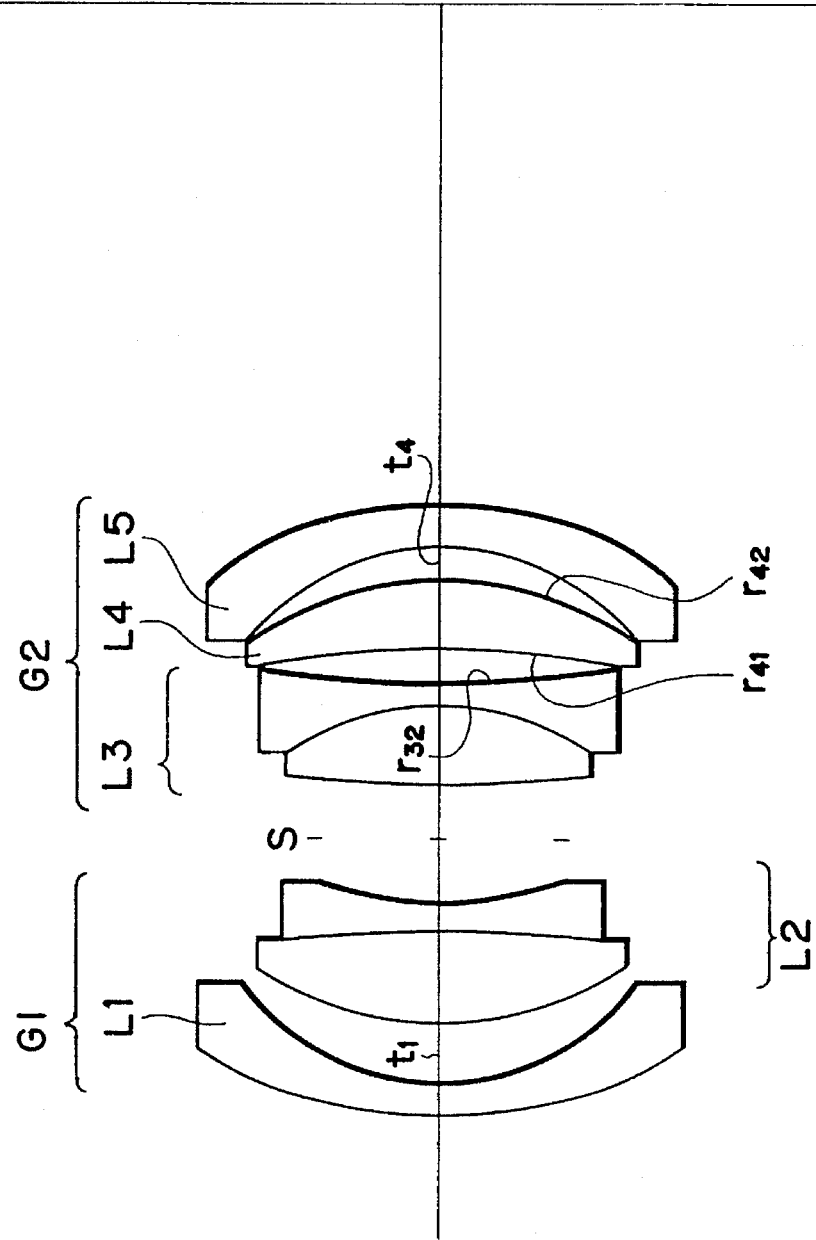
FIG. 1 shows the lens construction of a first embodiment of the present invention.
Figure 2:
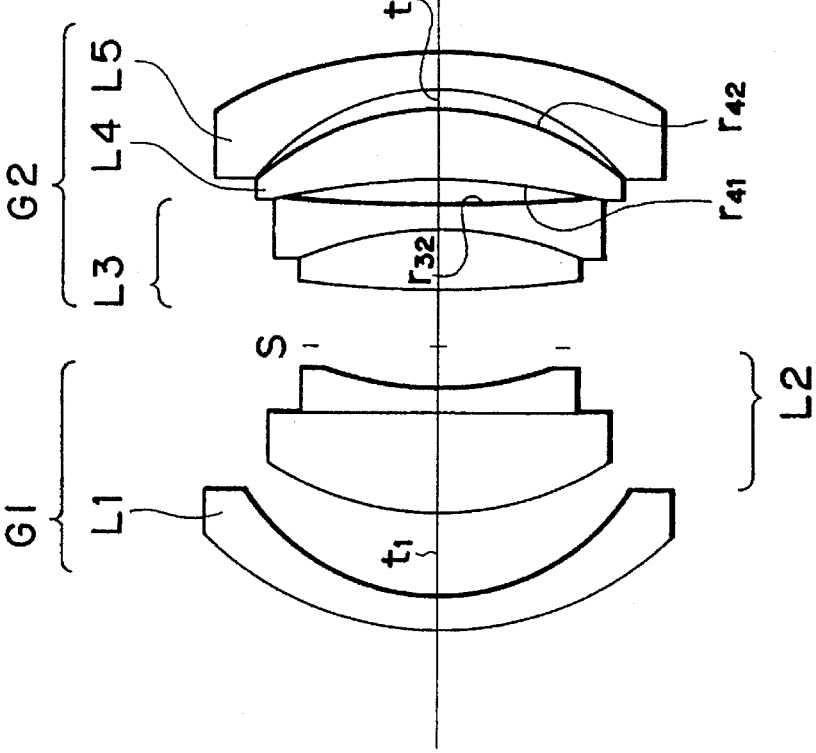
FIG. 2 shows the lens construction of a second embodiment of the present invention.
Figure 3:
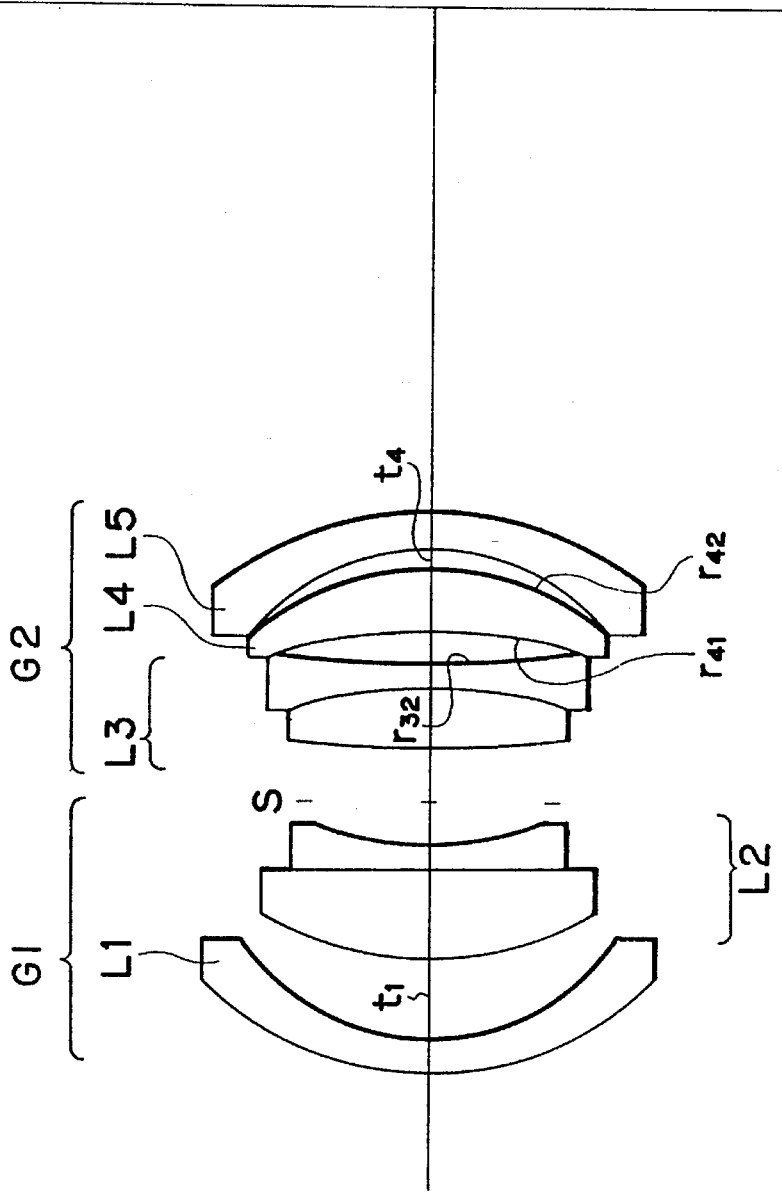
FIG. 3 shows the lens construction of a third embodiment of the present invention.
Figure 4:
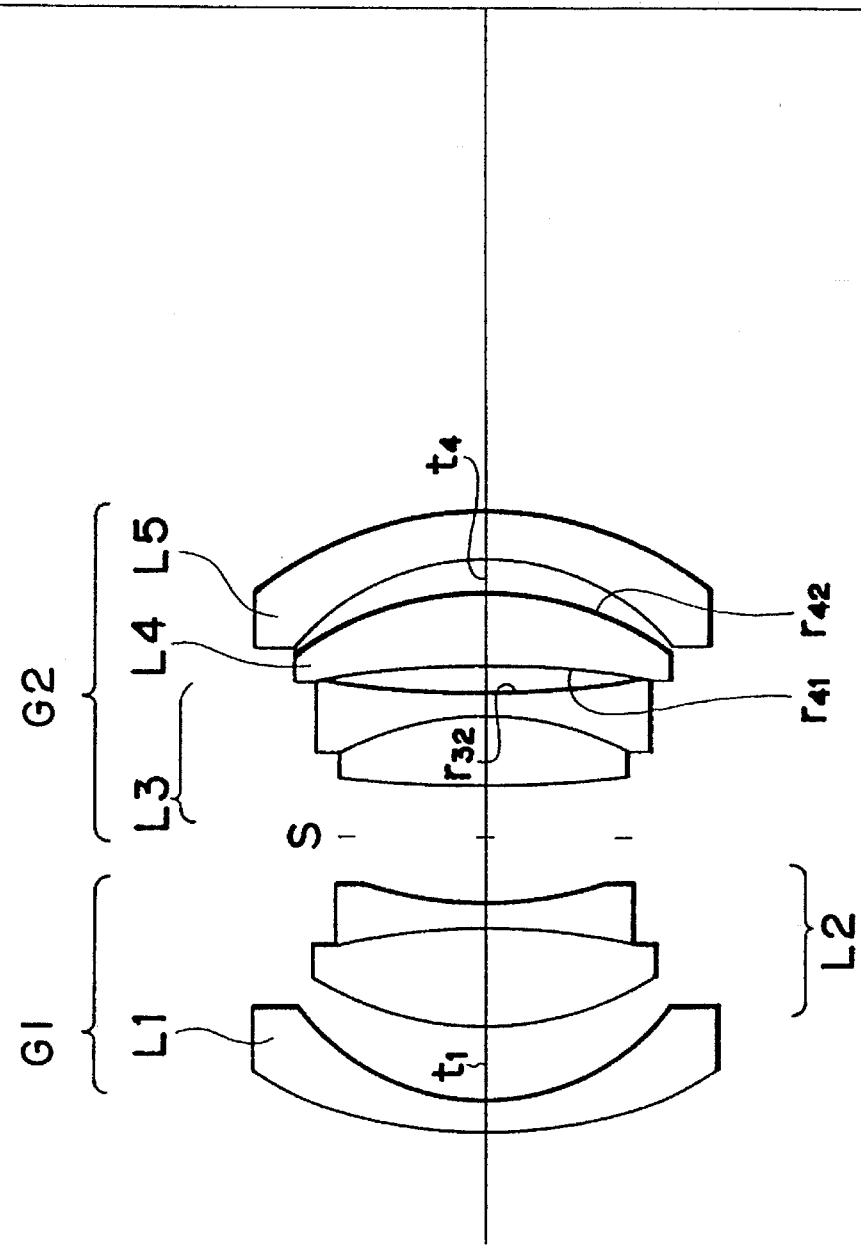
FIG. 4 shows the lens construction of a fourth embodiment of the present invention.
Figure 5:
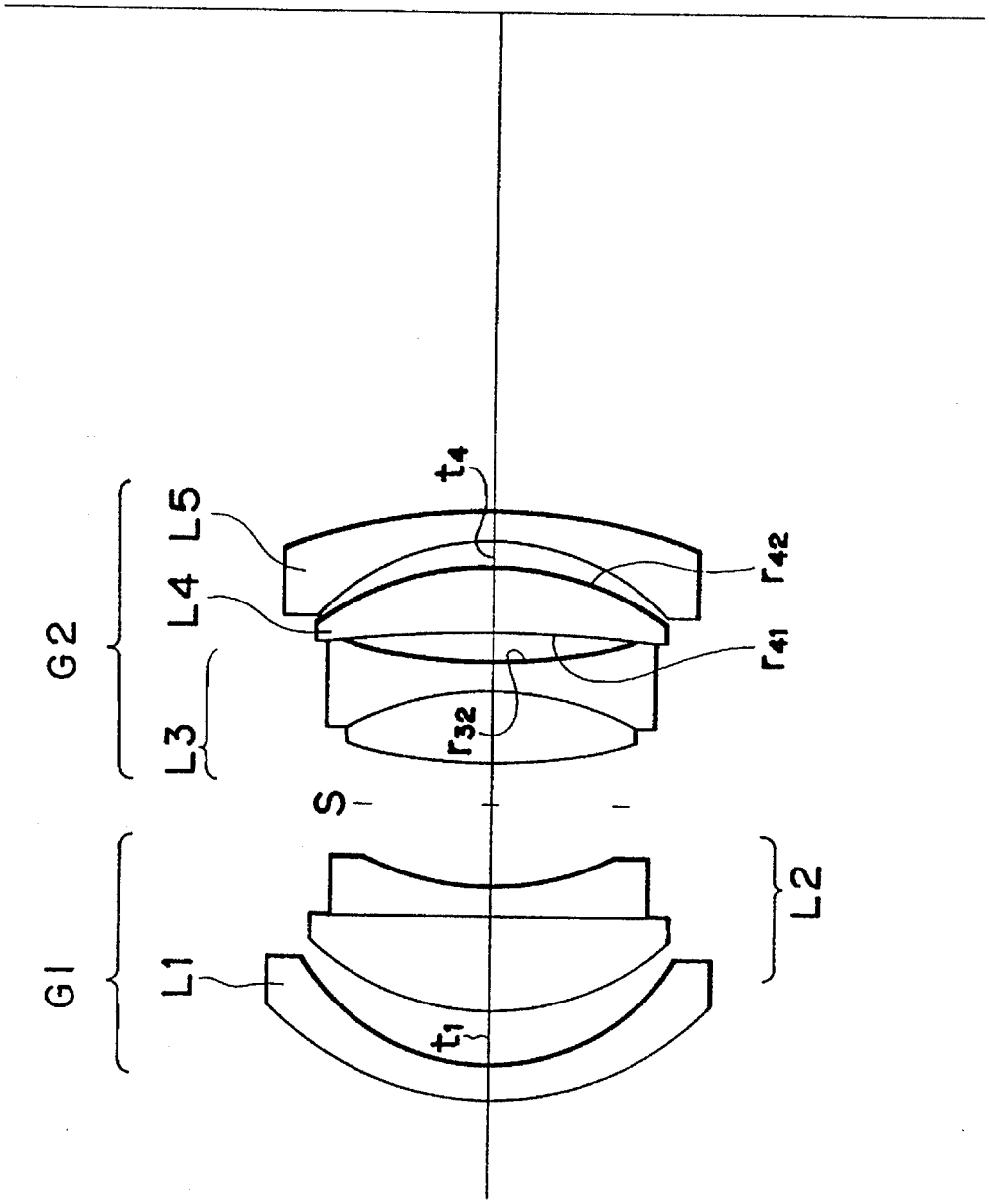
FIG. 5 shows the lens construction of a fifth embodiment of the present invention.
Figure 6:
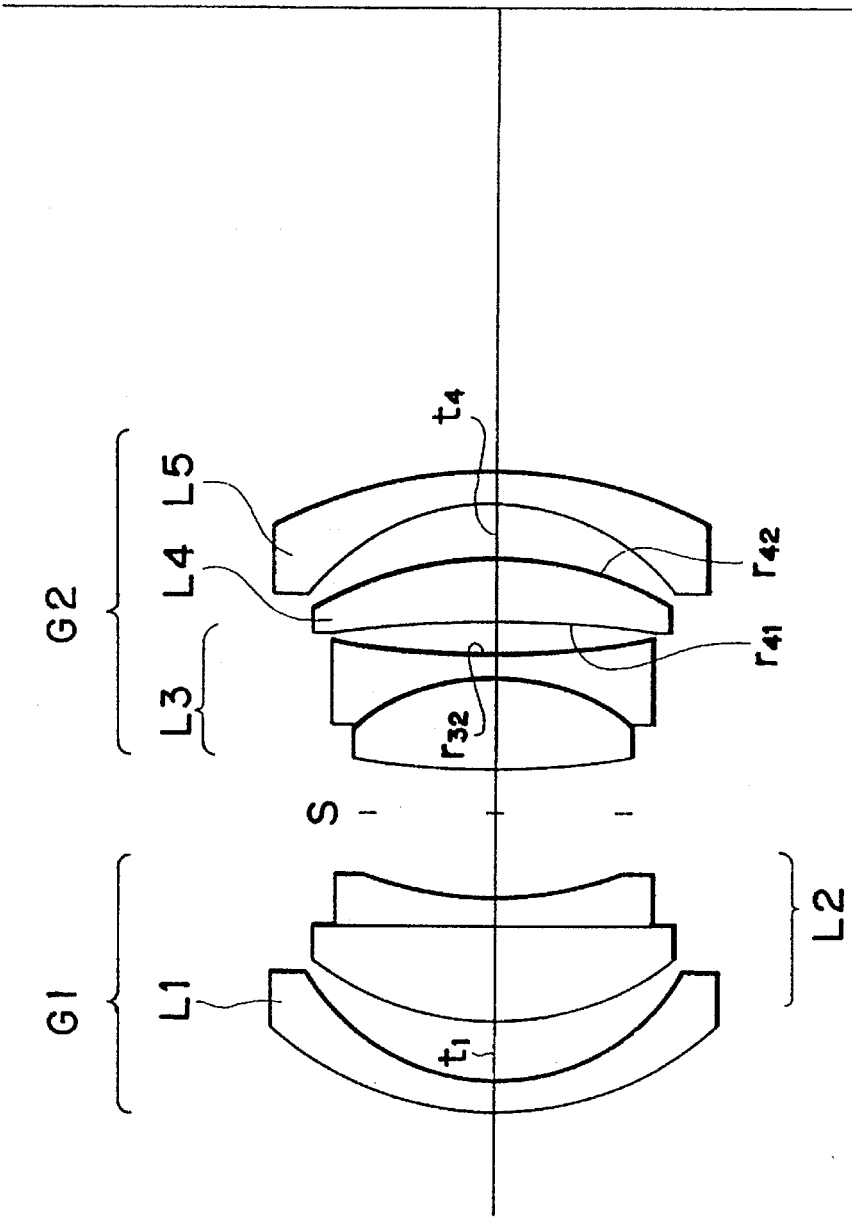
FIG. 6 shows the lens construction of a sixth embodiment of the present invention.
Figure 7:
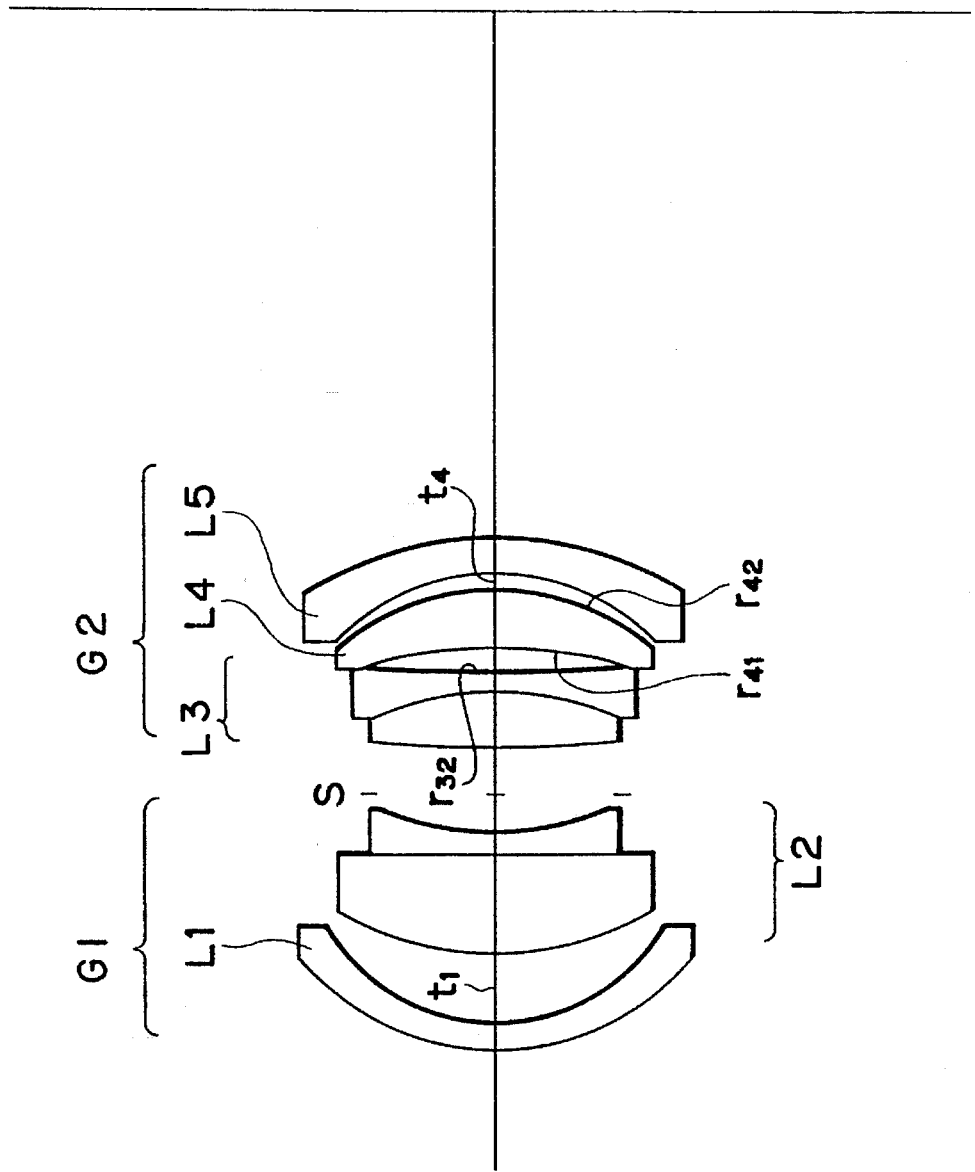
FIG. 7 shows the lens construction of a seventh embodiment of the present invention.

Some embodiments of the present invention will hereinafter be described in detail with reference to the accompanying drawings.

FIGS. 1 to 8 show the lens constructions of first to eighth embodiments, respectively, of the present invention. The wide-angle lenses according to the present invention, as shown in FIGS. 1 to 8, comprise, in succession from the object side, a first lens component L1 comprising a negative meniscus single lens having its convex surface facing the object side, a meniscus-shaped second lens component L2 having its convex surface facing the object side and having positive refractive power, a third lens component L3 comprising a cemented meniscus lens comprising a positive lens and a negative lens cemented together and having its convex surface facing the object side and having positive refractive power, a fourth lens component L4 comprising a positive meniscus single lens having its concave surface facing the object side, a fifth lens component L5 comprising a negative meniscus single lens having its concave surface facing the object side, and a stop between the second lens component L2 and the third lens component L3, is constructed into a negative, positive, negative refractive power arrangement as a whole, and is designed to satisfy at least one of the following conditions:

$$0.02 \leq |t_1/f_1| \leq 0.1 \tag{1}$$

$$0.01 \leq |t_4/f_5| \leq 0.08 \tag{2}$$

$$-0.85 \leq (r_{32}+r_{41})/(r_{32}-r_{41}) \leq 0.90, \tag{3}$$

where $t_1$: the air space on the optical axis from that surface of the first lens component L1 which is most adjacent to the image side to that surface of the second lens component L2 which is most adjacent to the object side, $t_4$: the air space on the optical axis from that surface of the fourth lens component L4 which is most adjacent to the image side to that surface of the fifth lens component L5 which is most adjacent to the object side, $f_1$: the focal length of the first lens component L1, $f_5$: the focal length of the fifth lens component L5, $r_{32}$: the radius of curvature of that surface of the third lens component L3 which is most adjacent to the image side, $r_{41}$: the radius of curvature of that surface of the fourth lens component L4 which is most adjacent to the object side.

As described above, the lens construction of the present invention is comprised of the first lens component L1 and the fifth lens component L5 each having negative refractive power, and the second lens component L2, the third lens component L3 and the fourth lens component L4 each having positive refractive power, and is a negative, positive, negative refractive power arrangement as a whole.

The first lens component L1 and the fifth lens component L5 each are a negative meniscus lens having its concave surface facing the stop S to sufficiently correct curvature of image field and astigmatism. By the negative meniscus lenses being thus used, it becomes possible to make the angle of view greater and increase the quantity of marginal light.

In a lens having a great angle of view, the correction of astigmatism and curvature of image field is important and it is necessary that the Petzval sum be an appropriate value.

Generally, in case of a lens of a negative, positive, negative refractive power arrangement having symmetry with respect to the stop S, as the air space between a lens unit adjacent to the object side and a positive lens unit and between a negative lens unit adjacent to the image side and the positive lens unit become wider, the degree of freedom of aberration correction increases more, and the Petzval sum can be made into an appropriate value.

However, where these air spaces are made great, the Petzval sum can be made into an appropriate value and this is advantageous for aberration correction, but the diameters of the fore and rear lenses become large and this is not preferable. Conversely, where these air spaces are made small, the Petzval sum increases to the positive and the correction of negative astigmastism and curvature of image field becomes difficult. So, where the refractive power of the first lens component L1 and of the fifth lens component L5 is made great to alleviate the Petzval sum, it will adversely affect coma, and this is not preferable.

The Petzval sum which is the cause of these problems can be improved to a certain degree by setting the refractive indices of the positive lens and the negative lens to appropriate values.

According to the present invention, in the symmetrical type wide-angle lens as disclosed in Japanese Utility Model Publication No. 43-30782, it becomes possible to divide the cemented positive lens disposed rearwardly of the stop into two lens components L3 and L4, effect the correction of spherical aberration by that surface $r_{32}$ of the third lens component L3 which is most adjacent to the image side and that surface $r_{41}$ of the fourth lens component L4 which is most adjacent to the object side, and make the F-number small. Further, since the cemented positive lens is divided into two lens components, the degree of freedom of aberration correction increases and it is possible to correct curvature of image field and astigmatism better.

The aforementioned conditional expressions of the present invention will hereinafter be described in detail.

Conditional expressions (1) and (2) are conditions regarding the correction of astigmatism and curvature of image field and compactness.

If the lower limit of conditional expression (1) is exceeded, the following two cases ① and ② are conceivable.

① A case where the air space $t_1$ between the first lens component L1 and the second lens component L2 is small; and ② A case where the focal length $f_1$ of the first lens component L1 is great.

In case ①, positive distortion increases and the correction of spherical aberration becomes impossible, and the F-number cannot be made small. In case ②, the Petzval sum increases to the positive and therefore, the correction of negative astigmastism and curvature of image field becomes impossible.

On the other hand, if the upper limit of conditional expression (1) is exceeded, the following two cases ③ and ④ are conceivable.

③ A case where the air space $t_1$ between the first lens component L1 and the second lens component L2 is great; and ④ A case where the focal length $f_1$ of the first lens component L1 is small.

In case ③, there is an advantage in aberration correction, but the diameter of the fore lens and the total thickness of the lens system become great and this is against the desire for compactness, and thus is not preferable. In case ④, Petzval sum decreases, but the coma under the principal ray increases to the negative in a portion which is great in the angle of view, and this is not preferable.

If the lower limit of conditional expression (2) is exceeded, the following two cases ⑤ and ⑥ are conceivable.

⑤ A case where the air space $t_4$ between the fourth lens component L4 and the fifth lens component L5 is small; and ⑥ A case where the focal length $f_5$ of the fifth lens component L5 is great.

In case ⑤, the correction of spherical aberration becomes impossible and the F-number cannot be made small. In case ⑥, the Petzval sum increases to the positive and the correction of negative astigmatism and curvature of image field becomes impossible, and a good image plane cannot be obtained.

On the other hand, if the upper limit of conditional expression (2) is exceeded, the following two cases ⑦ and ⑧ are conceivable.

⑦ A case where the air space $t_4$ between the fourth lens component L4 and the fifth lens component L5 is great; and ⑧ A case where the focal length $f_5$ of the fifth lens component L5 is small.

In case ⑦, the degree of freedom with which the Petzval sum is made into an appropriate value increases and this is advantageous in correcting astigmatism and curvature of image field, but the total thickness of the lens system becomes great and this is against the desire for compactness, and thus is not preferable. In case ⑧, the correction of spherical aberration becomes impossible and further, the fluctuation of the coma above the principal ray by the angle of view becomes great and this is not preferable.

Conditional expression (3) is a condition regarding the shape of the air space between the third lens component L3 and the fourth lens component L4, and is concerned with coma, curvature of image field and astigmatism.

If the upper limit of conditional expression (3) is exceeded, the Petzval sum will increase to the positive and cannot be made into an appropriate value and the correction of astigmatism and curvature of image field will become difficult, and a good image plane cannot be obtained. Also, the shape of coma will exhibit a sharp tendency toward inner coma, and this is not preferable.

If conversely, the lower limit of conditional expression (3) is exceeded, a good Petzval sum will be obtained, but aberrations of high orders will occur in a portion which is great in the angle of view and astigmatism will become great. Also, the shape of coma will exhibit a great tendency toward outer coma, and this is not preferable.

It is desirable that in order to correct spherical aberration, curvature of image field and astigmatism and to form the lens compactly, the wide-angle lens according to the present invention be designed to further satisfy the following conditions:

$$0.20 \leq |r_{42}/f| \leq 0.55 \quad (4)$$

$$0.40 \leq D/f \leq 1.00, \quad (5)$$

where f: the focal length of the entire lens system, $r_{42}$: the radius of curvature of that surface of the fourth lens component L4 which is most adjacent to the image side, D: total thickness of the lens system. Conditional expression (4) is concerned with the correction of spherical aberration.

If the upper limit value of conditional expression (4) is exceeded, it will become impossible to correct positive spherical aberration, and this is not preferable.

If conversely, the lower limit value of conditional expression (4) is exceeded, it will become impossible to correct negative spherical aberration, and this is not preferable.

Now, the wide-angle lens of the present invention is characterized in that, as compared with popular symmetrical type wide-angle lenses, its back focal length differs little, but the total thickness of the lens is very small. This makes it possible to make the lens barrel into the sunk barrel type to thereby contain it compactly when the lens of the present invention is used in a compact lens shutter camera or a camera with a range finder, and it is more realistic and effective to make the total thickness of the lens system small than to shorten the back focal length.

So, conditional expression (5) sets a condition for prescribing the total thickness of the lens system, i.e., the length from that surface of the first lens component L1 which is most adjacent to the object side to that surface of the fifth lens component L5 which is not adjacent to the image side.

If the lower limit value of conditional expression (5) is exceeded, the difference in height between the on-axis ray and the off-axis ray will become small in the lens far from the stop S and the degree of freedom will be deficient and thus, it will become impossible to correct the on-axis aberration and the off-axis aberration independently of each other.

If conversely, the upper limit value of conditional expression (5) is exceeded, the Petzval sum can be made into an appropriate value and a better image plane performance will be obtained, but this is against the desire for compactness and is therefore against an object of the present invention.

Also, it is desirable that in order to correct curvature of image field and astigmatism better, the first lens component L1, the third lens component L3 and the fifth lens component L5 be designed to satisfy the following conditions:

$$0.04 < N_{31} - N_{32} < 0.25 \quad (6)$$

$$N_1 < 1.70 \quad (7)$$

$$N_5 < 1.70, \quad (8)$$

where $N_{31}$: the refractive index of the positive lens L3 disposed on the object side in the third lens component L3 for d-line, the refractive index of the negative $N_{32}$: the refractive index of the negative lens disposed on the image side in the third lens component L3 for d-line, $N_1$: the refractive index of the first lens component L1 for d-line, $N_5$: the refractive index of the fifth lens component L5 for d-line.

Conditional expression (6) represents the difference between the refractive indices of the position lens disposed on the object side in the third lens component L3 and the negative lens disposed on the image side in the third lens component L3 for d-line.

If the lower limit value of conditional expression (6) is exceeded, the Petzval sum will increase to the positive and therefore, it will become impossible to correct negative curvature of image field and astigmatism.

If conversely, the upper limit value of conditional expression (6) is exceeded, a better Petzval sum will be obtained, but aberrations of high orders will occur in a portion which is great in the angle of view and astigmatic difference will be created, and this is not preferable.

Conditional expressions (7) and (8) are concerned with curvature of image field and astigmatism.

If the upper limit values of these conditional expressions are exceeded, the Petzval sum will increase to the positive and therefore, the correction of curvature of image field and negative astigmatism will become impossible and a good image plane will not be obtained.

Another embodiment of the present invention has a first lens unit and a second lens unit disposed with a stop interposed therebetween, on the object side of the stop and on the image side of the stop, respectively, said first lens unit comprising, in succession from the object side, a first lens component of negative refractive power and a second lens component of positive refractive power, said second lens unit comprising a third lens component of positive refractive power and a fourth lens component of negative refractive power, said first lens unit and said second lens unit being designed such that during focusing, they are moved on the optical axis toward the object side and the amounts of movement of said lens units on the optical axis differ from each other.

The present invention as a whole is of a negative, positive, negative refractive power arrangement. The first lens component of negative refractive power in the first lens unit disposed at a location remote from the stop and the fourth lens component of negative refractive power in the second lens unit are negative meniscus lenses having their concave surfaces facing the stop in order to sufficiently correct curvature of image field and astigmatism. The use of the negative meniscus lenses leads to the achievement of a wider angle and the provision of the action of increasing the quantity of marginal light.

The present invention makes the first lens unit and the second lens unit take their share of the correction of on-axis aberration and the correction of off-axis aberration. Specifically, there are the following two kinds of sharing:

(a) To achieve a wide-angle and yet make the refractive power of the first lens unit small in the positive, thereby correcting the off-axis aberration well with the first lens unit, and make the refractive power of the second lens unit great in the positive and divide the positive lens component in the second lens unit into two lens components, thereby correcting the on-axis aberration well with the second lens unit and making the optical system bright.

(b) To achieve a wide-angle and yet make the refractive power of the second lens unit small in the positive, thereby correcting the off-axis aberration well with the second lens unit, and make the refractive power of the first lens unit great in the positive and divide the positive lens component in the first lens unit into two lens components, thereby correcting the on-axis aberration well with the first lens unit and making the optical system bright.

In the present invention, as described in items (a) and (b) above, the lens units forward and rearward of the stop S are made to take their share of the correction of the on-axis aberration and the correction of the off-axis correction to thereby enable the optical system to be bright, but correspondingly thereto, the symmetry of the refractive power on both sides of the stop is destroyed. Therefore, when focusing is effected by the use of the whole axial movement system, it becomes impossible to suppress the fluctuation of the off-axis aberration well.

So, the fluctuation of the off-axis aberration, when focusing is effected by the use of the whole axial movement system, will hereinafter be considered with respect to the following two types of optical systems in which the refractive power distribution on both sides of the stop is asymmetrical, (I) Petrofocus Type; and (II) Telephoto Type.

In the case of (I) above, the refractive power arrangement on both sides of the stop is negative and positive and the pupil magnification exceeds 1. Therefore, when the object position moves from the infinity state to a short distance, positive astigmatism occurs.

In the case of (II) above, the refractive power arrangement on both sides of the stop is positive and negative and the pupil magnification is smaller than 1. Therefore, when the object position moves from the infinity state to a short distance, negative astigmatism occurs.

In the present embodiment, when focusing by the whole axial movement is effected, the construction of item (a) above corresponds to (I) above, and when the object position moves from the infinity state to a short distance, positive astigmatism occurs. According to the definition of the third-order aberration coefficient in Lens Designing Method by Yoshiya Matsui, the third-order aberration coefficient III of the second lens unit exhibits the positive (+). Therefore, if the amount of axial movement of the second lens unit is made small relative to the amount of axial movement of the first lens unit, positive astigmatism could be suppressed well and the fluctuation of off-axis aberration caused during focusing could be suppressed.

Conversely, the construction of item (b) above corresponds to (II) above, and when the object position moves from the infinity state to a short distance, negative astigmatism occurs. At this time, the third-order aberration coefficient III of the second lens unit exhibits the negative (−). Therefore, if the amount of axial movement of the second lens unit is made great relative to the amount of axial movement of the first lens unit, the fluctuation of off-axis aberration caused during focusing could be alleviated.

As described above, the present invention effects focusing by the use of the so-called floating system that makes the amounts of axial movement of the first lens unit and the second lens unit different from each other during focusing, thereby enabling the fluctuation of off-axis aberration caused by focusing to be suppressed well.

In the present invention, it is desirable that with the above-described construction, the following conditional expression (9) or (10) be satisfied.

$$0 < \Delta \cdot \phi / (\phi_a - \phi_b) < 0.2 \quad (9)$$

$$0.3 < |\phi 1/\phi| < 0.95 \quad (10)$$

where $\phi_a$: the refractive power of the first lens unit, $\phi_b$: the refractive power of the second lens unit, $\phi$: the refractive power of the whole lens system, $\Delta$: an amount defined by the following equation:

$$\Delta = (\delta 1 - \delta 2)/\delta 2$$

when the amount of movement of the first lens unit during focusing is $\delta 1$ and the amount of movement of the second lens unit is $\delta 2$, $\phi 1$: the refractive power of the first lens component.

Conditional expression (9) is a condition for suppressing the fluctuation of aberration in short distance focusing very well.

If the upper limit value of conditional expression (9) is exceeded, the correction of the fluctuation of off-axis aberration caused by focusing will become excessive. If conversely, the lower limit value of conditional expression (9) is exceeded, the correction of the fluctuation of off-axis aberration caused by focusing will become deficient. Accordingly, it is preferable that the range of this condition be satisfied.

Conditional expression (10) is a condition for achieving the balance of the shortening of the full length and the effective diameter of the front lens.

If the upper limit value of conditional expression (10) is exceeded, the refractive power of the first lens component will become great to the negative and therefore, the diverging action will become strong and the back focal length will become too great. If conversely, the lower limit value of conditional expression (10) is exceeded, the refractive power of the first lens component will become small to the negative and the height of the ray of off-axis light passing through the first lens component will become far from the optical axis, and if an attempt is made to obtain the amount of marginal light, the effective diameter of the front lens will become great, which will lead to the bulkiness of the optical system, and this is not preferable.

The lens constructions of the embodiments of the present invention will hereinafter be described in greater detail.

All of Embodiments 1 to 7, as shown in FIGS. 1 to 7, are lens systems of two groups G1 and G2 constituting is a lens of five-unit seven-component construction comprising, in succession from the object side, a first lens component L1 which is a negative meniscus lens having its convex surface facing the object side, a second lens component L2 which is a cemented positive meniscus lens comprising a biconvex lens and a biconcave lens, a stop S, a third lens component L3 which is a cemented positive meniscus lens comprised of a biconvex lens and a biconcave lens, a fourth lens component L4 which is a positive meniscus lens having its concave surface facing the object side, and a fifth lens component L5 which is a negative meniscus lens having its concave surface facing the object side.

Figure 8:
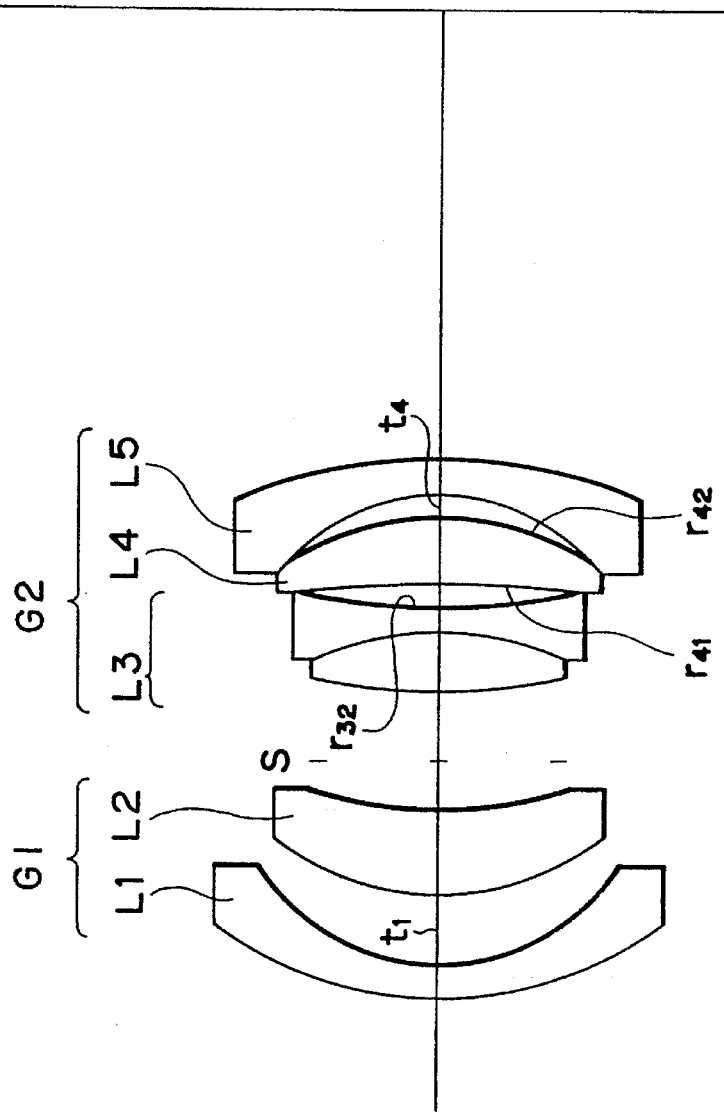
FIG. 8 shows the lens construction of an eighth embodiment of the present invention.

Also, Embodiment 8, as shown in FIG. 8, is a lens of five-unit six-component construction comprising, in succession from the object side, a first lens component L1 which is a negative meniscus lens having its convex surface facing the object side, a second lens component L2 which is a positive meniscus lens having its convex surface facing the object side, a stop S, a third lens component L3 which is a cemented positive meniscus lens comprised of a biconvex lens and a biconcave lens, a fourth lens component L4 which is a positive meniscus lens having its concave surface facing the object side, and a fifth lens component L5 which is a negative meniscus lens having its concave surface facing the object side.

The numerical data of the respective embodiments of the present invention will be shown in Tables 1 to 8 below. In these tables, f represents the focal length, $F_{NO}$ represents F-number and $2\omega$ represents the angle of view. The numbers at the left end represent the order from the object side, r represents the radius of curvature of each lens surface, d represents the spacing between adjacent lens surfaces, and the refractive index n and Abbe number $\nu$ are values for d-line ($\lambda$=587.6 nm).

TABLE 1

(Numerical Data of Embodiment 1)
f = 28.9
$F_{NO}$ = 2.88
$2\omega$ = 73.8°

|  | r | d | n | $\upsilon$ |
|---|---|---|---|---|
| 1 | 17.100 | 1.50 | 1.54739 | 53.5 |
| 2 | 9.282 | 2.70 |  |  |
| 3 | 12.910 | 3.90 | 1.84042 | 43.3 |
| 4 | −60.183 | 1.10 | 1.62588 | 35.7 |
| 5 | 14.650 | 5.00 |  |  |
| 6 | 50.105 | 3.30 | 1.79668 | 45.4 |
| 7 | −10.659 | 1.00 | 1.67270 | 32.2 |
| 8 | 43.956 | 1.40 |  |  |
| 9 | −36.842 | 3.00 | 1.79668 | 45.4 |
| 10 | −13.025 | 1.50 |  |  |
| 11 | −9.805 | 1.50 | 1.58144 | 40.8 |
| 12 | −14.846 | 20.83 |  |  |

The condition-corresponding values of the above data are shown below.

(1) $|t_1/f_1|$=0.068
(2) $|t_4/f_5|$=0.027
(3) $(r_{32}+r_{41})/(r_{32}-r_{41})$=0.088
(4) $|r_{42}/f|$=0.451
(5) D/f=0.897
(6) $N_{31}-N_{32}$=0.123
(7) $N_1$=1.547
(8) $N_5$=1.581

TABLE 2

(Numerical Data of Embodiment 2)
f = 28.9
$F_{NO}$ = 2.87
$2\omega$ = 73.0°

|  | r | d | n | $\upsilon$ |
|---|---|---|---|---|
| 1 | 12.475 | 1.50 | 1.57501 | 41.6 |
| 2 | 8.882 | 3.10 |  |  |
| 3 | 12.551 | 4.40 | 1.84042 | 43.3 |
| 4 | −1631.732 | 1.00 | 1.64831 | 33.8 |
| 5 | 12.856 | 4.00 |  |  |
| 6 | 43.791 | 2.50 | 1.79668 | 45.4 |
| 7 | −13.768 | 1.00 | 1.67270 | 32.2 |
| 8 | 77.172 | 1.10 |  |  |
| 9 | −25.300 | 2.70 | 1.79668 | 45.4 |
| 10 | −10.647 | 1.00 |  |  |
| 11 | −8.993 | 1.50 | 1.58144 | 40.8 |
| 12 | −17.685 | 20.51 |  |  |

The condition-corresponding values of the above data are shown below.

(1) $|t_1/f_1|$=0.051
(2) $|t_4/f_5|$=0.024
(3) $(r_{32}+r_{41})/(r_{32}-r_{41})$=0.506
(4) $|r_{42}/f|$=0.369
(5) D/f=0.824
(6) $N_{31}-N_{32}$=0.056
(7) $N_1$=1.532
(8) $N_5$=1.581

TABLE 3

(Numerical Data of Embodiment 3)
f = 28.9
$F_{NO}$ = 2.87
$2\omega$ = 74.0°

|  | r | d | n | $\upsilon$ |
|---|---|---|---|---|
| 1 | 12.422 | 1.50 | 1.53172 | 49.1 |
| 2 | 8.919 | 3.37 |  |  |
| 3 | 12.829 | 3.87 | 1.84042 | 43.3 |
| 4 | −1726.972 | 1.00 | 1.64831 | 33.8 |
| 5 | 12.785 | 4.00 |  |  |
| 6 | 51.931 | 2.50 | 1.81600 | 46.8 |
| 7 | −17.040 | 1.00 | 1.61750 | 30.8 |
| 8 | 54.857 | 1.31 |  |  |
| 9 | −21.730 | 2.95 | 1.79668 | 45.4 |
| 10 | −10.479 | 0.80 |  |  |
| 11 | −8.874 | 1.50 | 1.59507 | 35.5 |
| 12 | −13.780 | 20.96 |  |  |

The condition-corresponding values of the above data are shown below.

(1) $|t_1/f_1|$=0.048
(2) $|t_4/f_5|$=0.017
(3) $(r_{32}+r_{41})/(r_{32}-r_{41})$=0.433
(4) $|r_{42}/f|$=0.363
(5) D/f=0.824
(6) $N_{31}-N_{32}$=0.199
(7) $N_1$=1.532
(8) $N_5$=1.595

TABLE 4

(Numerical Data of Embodiment 4)
f = 28.9
$F_{NO}$ = 2.87
$2\omega$ = 73.4°

|  | r | d | n | $\upsilon$ |
|---|---|---|---|---|
| 1 | 18.080 | 1.50 | 1.56384 | 60.9 |
| 2 | 9.40 | 13.26 |  |  |
| 3 | 13.713 | 4.18 | 1.80218 | 44.7 |
| 4 | −28.737 | 1.10 | 1.61293 | 37.0 |
| 5 | 17.068 | 5.00 |  |  |
| 6 | 48.775 | 3.14 | 1.80218 | 44.7 |
| 7 | −11.832 | 1.00 | 1.68893 | 31.1 |
| 8 | 38.220 | 1.22 |  |  |
| 9 | −0.592 | 3.30 | 1.79668 | 45.4 |
| 10 | −12.910 | 1.60 |  |  |
| 11 | −9.672 | 2.00 | 1.58144 | 40.8 |
| 12 | −13.780 | 20.96 |  |  |

The condition-corresponding values of the above data are shown below.

(1) $|t_1/f_1|$=0.088
(2) $|t_4/f_5|$=0.028
(3) $(r_{32}+r_{41})/(r_{32}-r_{41})$=−0.030
(4) $|r_{42}/f|$=0.447
(5) D/f=0.945
(6) $N_{31}-N_{32}$=0.113

(7) $N_1$=1.564

(8) $N_5$=1.582

TABLE 5

(Numerical Data of Embodiment 5)
f = 35.0
$F_{NO}$ = 2.80
2ω = 62.4°

|   | r | d | n | υ |
|---|---|---|---|---|
| 1 | 13.804 | 1.40 | 1.61025 | 57.6 |
| 2 | 9.560 | 2.50 | | |
| 3 | 11.800 | 4.20 | 1.79668 | 43.3 |
| 4 | −1901.932 | 1.20 | 1.68893 | 31.2 |
| 5 | 12.250 | 5.75 | | |
| 6 | 23.817 | 3.30 | 1.72000 | 50.3 |
| 7 | −12.861 | 1.20 | 1.62588 | 35.6 |
| 8 | 23.478 | 1.25 | | |
| 9 | −92.286 | 3.20 | 1.79631 | 40.9 |
| 10 | −13.150 | 1.00 | | |
| 11 | −10.885 | 1.40 | 1.67003 | 47.1 |
| 12 | −26.314 | 22.10 | | |

The condition-corresponding values of the above data are shown below.

(1) $|t_1/f_1|$=0.047

(2) $|t_4/f_5|$=0.035

(3) $(r_{32}+r_{41})/(r_{32}-r_{41})$=−0.595

(4) $|r_{42}/fl|$=0.376

(5) D/f=0.747

(6) $N_{31}-N_{32}$=0.094

(7) $N_1$=1.670

(8) $N_5$=1.670

TABLE 6

(Numerical Data of Embodiment 6)
f = 35.0
$F_{NO}$ = 2.80
2ω = 62.4°

|   | r | d | n | υ |
|---|---|---|---|---|
| 1 | 15.140 | 1.40 | 1.51680 | 64.1 |
| 2 | 9.852 | 2.60 | | |
| 3 | 13.541 | 4.20 | 1.79668 | 45.4 |
| 4 | −1960.755 | 1.20 | 1.67270 | 32.1 |
| 5 | 16.374 | 5.75 | | |
| 6 | 38.906 | 4.20 | 1.79668 | 45.4 |
| 7 | −9.900 | 1.20 | 1.67270 | 32.1 |
| 8 | 39.474 | 1.40 | | |
| 9 | −56.315 | 3.00 | 1.74950 | 35.2 |
| 10 | −15.623 | 2.30 | | |
| 11 | −10.487 | 1.40 | 1.53172 | 49.1 |
| 12 | −22.411 | 20.87 | | |

The condition-corresponding values of the above data are shown below.

(1) $|t_1/f_1|$=0.043

(2) $|t_4/f_5|$=0.060

(3) $(r_{32}+r_{41})/(r_{32}-r_{41})$=−0.176

(4) $|r_{42}/fl|$=0.446

(5) D/f=0.819

(6) $N_{31}-N_{32}$=0.124

(7) $N_1$=1.517

(8) $N_5$=1.532

TABLE 7

(Numerical Data of Embodiment 7)
f = 35.0
$F_{NO}$ = 2.80
2ω = 62.6°

|   | r | d | n | υ |
|---|---|---|---|---|
| 1 | 11.026 | 1.50 | 1.57501 | 41.6 |
| 2 | 8.859 | 3.28 | | |
| 3 | 14.478 | 4.60 | 1.84042 | 43.3 |
| 4 | −226.717 | 1.00 | 1.64831 | 33.8 |
| 5 | 13.585 | 4.00 | | |
| 6 | 78.289 | 2.50 | 1.80411 | 46.4 |
| 7 | −13.768 | 1.00 | 1.67270 | 32.2 |
| 8 | 100.000 | 1.15 | | |
| 9 | −20.464 | 2.95 | 1.79668 | 45.4 |
| 10 | −10.474 | 0.80 | | |
| 11 | −9.468 | 1.50 | 1.58267 | 46.5 |
| 12 | −16.567 | 25.07 | | |

The condition-corresponding values of the above data are shown below.

(1) $|t_1/f_1|$=0.031

(2) $|t_4/f_5|$=0.019

(3) $(r_{32}+r_{41})/(r_{32}-r_{41})$=0.660

(4) $|r_{42}/fl|$=0.299

(5) D/f=0.694

(6) $N_{31}-N_{32}$=0.131

(7) $N_1$=1.575

(8) $N_5$=1.583

TABLE 8

(Numerical Data of Embodiment 8)
f = 28.9
$F_{NO}$ = 2.88
2ω = 73.8°

|   | r | d | n | υ |
|---|---|---|---|---|
| 1 | 14.953 | 1.50 | 1.59507 | 35.5 |
| 2 | 8.621 | 2.94 | | |
| 3 | 10.597 | 3.76 | 1.80411 | 46.4 |
| 4 | 17.712 | 5.00 | | |
| 5 | 24.439 | 2.50 | 1.79668 | 45.4 |
| 6 | −12.240 | 1.00 | 1.67270 | 32.2 |
| 7 | 25.235 | 1.10 | | |
| 8 | −49.274 | 2.90 | 1.79631 | 40.9 |
| 9 | −11.514 | 1.00 | | |
| 10 | −8.160 | 1.50 | 1.58144 | 40.8 |
| 11 | −21.421 | 19.32 | | |

The condition-corresponding values of the above data are shown below.

(1) $|t_1/f_1|$=0.078

(2) $|t_4/f_5|$=0.042

(3) $(r_{32}+r_{41})/(r_{32}-r_{41})$=−0.323

(4) $|r_{42}/fl|$=0.399

(5) D/f=0.803

(6) $N_{31}-N_{32}$=0.124

(7) $N_1$=1.595

(8) $N_5$=1.581

By using popular aspherical lenses, it is of course possible to introduce an aspherical surface into the first lens component L1 or the fifth lens component L5 of the present invention to thereby correct astigmatism and curvature of image field better and achieve a wide-angle, and to introduce an aspherical surface into the second lens component L2, the third lens component L3 or the fourth lens component L4 to thereby further correct spherical aberration and achieve a great relative aperture.

Figure 9A:
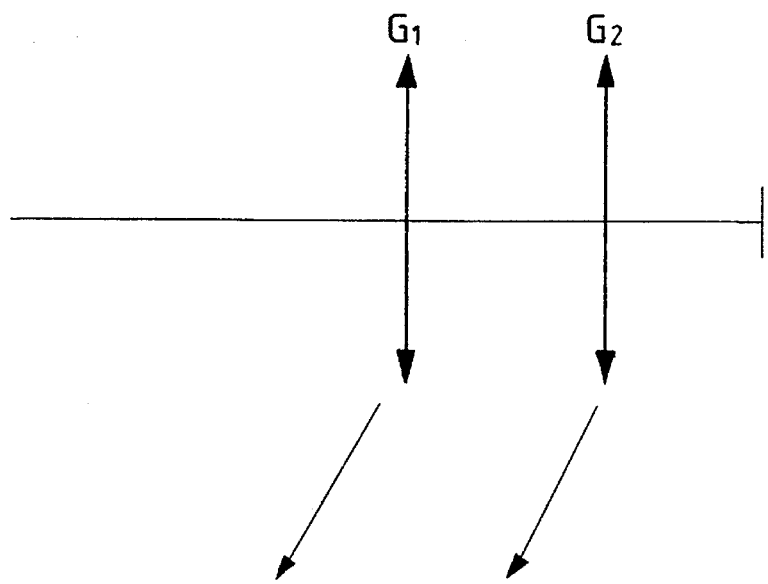
FIGS. 9A and 9B are schematic views schematically showing the refractive power arrangements in ninth to thirteenth embodiments of the present invention and in which objects are at infinity and a near distance, respectively.
Figure 9B:
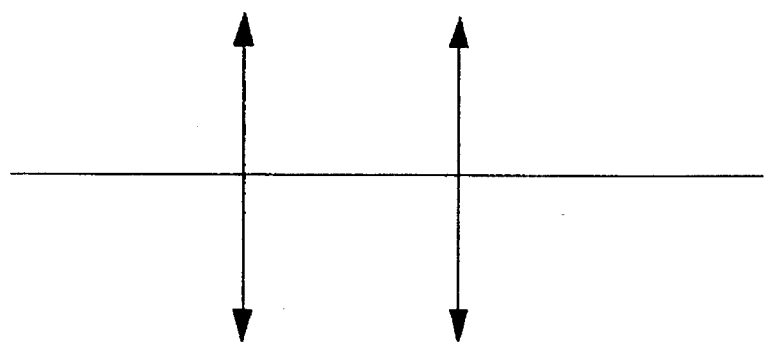

FIGS. 9A and 9B schematically show the refractive power arrangements of ninth to thirteenth embodiment of the present invention. FIG. 9A shows the refractive power arrangement when the object position is in the infinity state, and FIG. 9B shows the refractive power arrangement when the object position is in a short distance state. It is shown in FIGS. 9A and 9B that as the object position moves from the infinity to the short distance, the first lens unit G1 and the second lens unit G2 move toward the object side.

Figure 10:
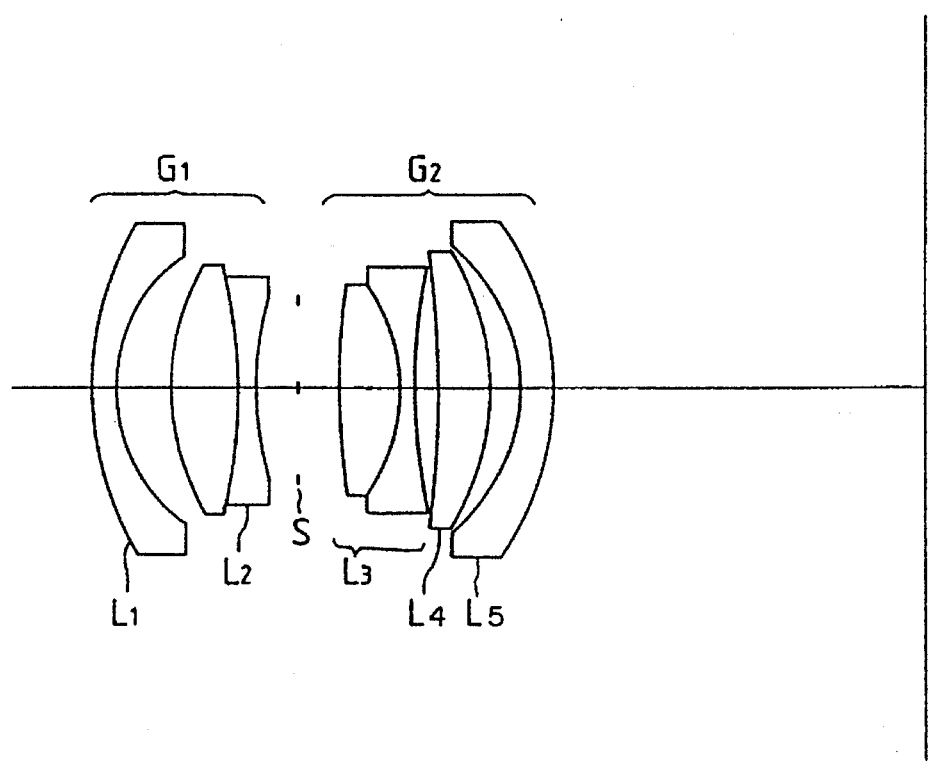
FIG. 10 shows the lens construction of the ninth to twelfth embodiments of the present invention.

Each of the ninth to twelfth embodiments, as shown in FIG. 10, is of a construction which comprises, in succession from the object side, a first lens component L1 which is a negative meniscus lens having its convex surface facing the object side, a second lens component L2 which is a cemented lens of positive refractive power comprising a biconvex lens and a biconcave lens cemented together and having its convex surface facing the object side as a whole, a third lens component L3 comprising a cemented lens component of positive refractive power comprising a biconvex lens having its convex surface of sharper curvature facing the image side and a biconcave lens cemented thereto and having its convex surface facing the object side as a whole, a fourth lens component L4 which is a positive lens component having its concave surface facing the object side, and a fifth lens component L5 which is a negative meniscus lens having its convex surface facing the image side, a stop S being disposed between the second lens component L2 and the third lens component L3.

The numerical data of the ninth to twelfth embodiments of the present invention are given below. In the data Tables below, the numbers at the left end represents the order from the object side, r represents the radius of curvature of each lens surface, d represents the spacing between adjacent lens surface, and the refractive index n and Abbe number ν are values for d-line (λ=587.6 nm).

TABLE 9

Numerical Data of the Ninth Embodiment
f = 28.6
FNO = 2.88
2ω = 74.0°

| | r | d | n | ν |
|---|---|---|---|---|
| 1 | 17.9178 | 1.500 | 1.58913 | 61.2 |
| 2 | 9.1148 | 3.000 | | |
| 3 | 14.8517 | 4.000 | 1.79668 | 45.4 |
| 4 | −22.6769 | 1.300 | 1.60342 | 38.0 |
| 5 | 19.6186 | 2.000 | | |
| 6 | ∞ | (d6) | (stop) | |
| 7 | 85.5391 | 3.000 | 1.79668 | 45.4 |
| 8 | −12.4521 | 1.300 | 1.67270 | 32.2 |
| 9 | 44.1538 | 1.300 | | |
| 10 | −49.9974 | 2.500 | 1.74810 | 52.3 |
| 11 | −13.6254 | 2.700 | | |
| 12 | −9.5518 | 2.000 | 1.64831 | 33.8 |
| 13 | −13.0360 | (Bf) | | |

Variations in the spacing when the photographing distance is infinity (∞) and a short distance (300 mm) are shown below.

TABLE 10

| Photographing Distance | Infinity | 300 mm |
|---|---|---|
| d6 | 3.000 | 2.651 |
| Bf | 21.891 | 25.382 |

The condition-corresponding values of the above data are shown below.

$$\Delta \cdot (\phi_a - \phi_b)/\phi = 0.071 \tag{1}$$

$$|\phi 1/\phi| = 0.051 \tag{2}$$

TABLE 11

Numerical Data of the Tenth Embodiment
f = 28.9
FNO = 2.88
2ω = 73.8°

| | r | d | n | ν |
|---|---|---|---|---|
| 1 | 17.8000 | 1.500 | 1.58913 | 61.2 |
| 2 | 9.3309 | 3.100 | | |
| 3 | 13.9124 | 3.900 | 1.79668 | 45.4 |
| 4 | −29.7570 | 1.100 | 1.60342 | 38.1 |
| 5 | 17.4563 | (d5) | | |
| 6 | ∞ | 2.400 | (stop) | |
| 7 | 49.4089 | 3.600 | 1.79668 | 45.4 |
| 8 | −10.5646 | 1.000 | 1.67270 | 32.2 |
| 9 | 35.7839 | 1.400 | | |
| 10 | −47.3829 | 3.300 | 1.79668 | 45.4 |
| 11 | −13.1267 | 1.600 | | |
| 12 | −9.9212 | 2.000 | 1.60432 | 38.1 |
| 13 | −15.6720 | (Bf) | | |

Variations in the spacing when the photographing distance is infinity (∞) and a short distance (300 mm) are shown below.

TABLE 12

| Photographing Distance | Infinity | 300 mm |
|---|---|---|
| d5 | 12.600 | 2.369 |
| Bf | 21.940 | 24.832 |

The condition-corresponding values of the above data are shown below.

$$\Delta \cdot \phi/(\phi_a - \phi_b) = 0.061 \tag{1}$$

$$|\phi 1/\phi| = 0.811 \tag{2}$$

TABLE 13

Numerical Data of the Eleventh Embodiment
f = 28.9
FNO = 2.88
2ω = 73.8°

| | r | d | n | ν |
|---|---|---|---|---|
| 1 | 12.5065 | 1.500 | 1.53172 | 49.1 |
| 2 | 8.7834 | 3.450 | | |
| 3 | 12.5521 | 3.950 | 1.84042 | 43.3 |
| 4 | −1626.4800 | 1.000 | 1.64831 | 33.8 |
| 5 | 12.6942 | (d5) | | |
| 6 | ∞ | 2.350 | (stop) | |
| 7 | 45.2763 | 2.500 | 1.80411 | 46.3 |
| 8 | −13.7592 | 1.000 | 1.67270 | 32.2 |
| 9 | 56.7133 | 1.150 | | |
| 10 | −25.5838 | 2.950 | 1.79668 | 45.4 |
| 11 | −10.3313 | 0.800 | | |
| 12 | −8.8304 | 1.500 | 1.58144 | 40.8 |
| 13 | −16.1578 | (Bf) | | |

Variations in the spacing when the photographing distance is infinity (∞) and a short distance (300 mm) are shown below.

TABLE 14

| Photographing Distance | Infinity | 300 mm |
|---|---|---|
| d5 | 1.650 | 1.545 |
| Bf | 20.514 | 24.033 |

The condition-corresponding values of the above data are shown below.

$$\Delta \cdot \phi/(\phi_a - \phi_b) = 0.022 \quad (1)$$

$$|\phi 1/\phi| = 0.447 \quad (2)$$

TABLE 15

Numerical Data of the Twelfth Embodiment
f = 28.9
$F_{NO} = 2.88$
2ω = 73.8°

|   | r | d | n | υ |
|---|---|---|---|---|
| 1 | 17.1000 | 1.500 | 1.54739 | 53.6 |
| 2 | 9.2824 | 2.700 | | |
| 3 | 12.9097 | 3.900 | 1.84042 | 43.3 |
| 4 | −60.1829 | 1.100 | 1.62588 | 35.6 |
| 5 | 14.6504 | (d5) | | |
| 6 | ∞ | 2.400 | (stop) | |
| 7 | 50.3000 | 3.300 | 1.79668 | 45.4 |
| 8 | −10.6591 | 1.000 | 1.67270 | 32.2 |
| 9 | 43.9560 | 1.400 | | |
| 10 | −36.8415 | 3.000 | 1.79668 | 45.4 |
| 11 | −13.0249 | 1.500 | | |
| 12 | −9.8051 | 1.500 | 1.58144 | 40.8 |
| 13 | −14.8205 | (Bf) | | |

Variations in the spacing when the photographing distance is infinity (∞) and a short distance (300 mm) are shown below.

TABLE 16

| Photographing Distance | Infinity | 300 mm |
|---|---|---|
| d5 | 2.600 | 2.427 |
| Bf | 20.830 | 5.727 |

The condition-corresponding values of the above data are shown below.

$$\Delta \cdot (\phi_a - \phi_b)/\phi = 0.046 \quad (1)$$

$$|\phi 1/\phi| = 0.726 \quad (2)$$

Figure 11:
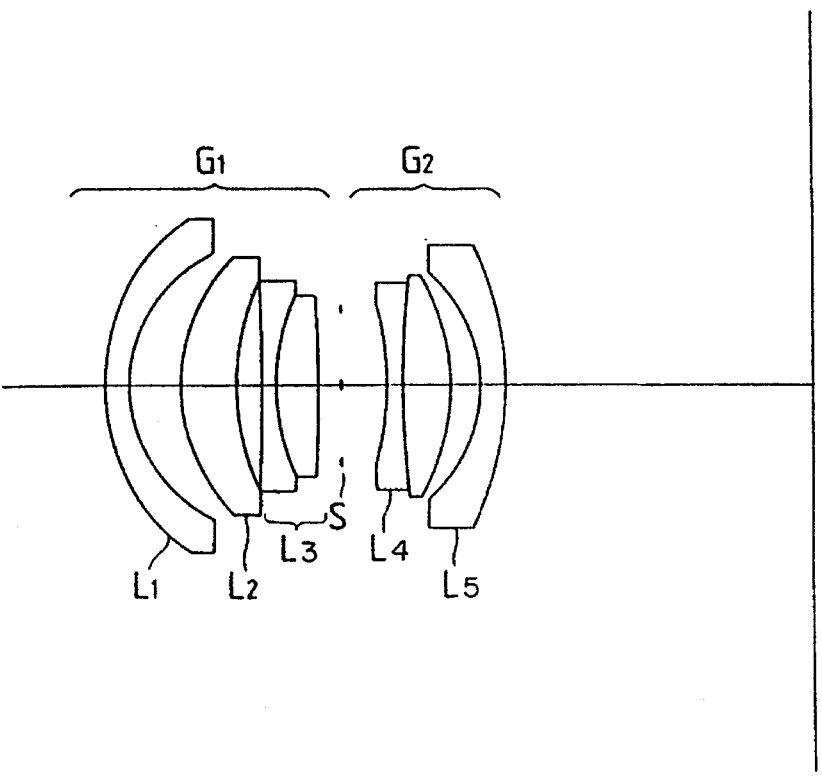
FIG. 11 shows the lens construction of the thirteenth embodiment of the present invention.

The thirteenth embodiment, as shown in FIG. 11, is of a construction which comprises, in succession from the object side, a first lens component L1 which is a negative meniscus lens having its convex surface facing the object side, a second lens component L2 which is a positive meniscus lens having its convex surface of sharp curvature facing the object side, a third lens component L3 which is a positive lens component comprising a biconcave lens having its concave surface of sharper curvature facing the image side and a biconvex lens having its convex surface of sharper curvature facing the object side, said biconcave lens and said biconvex lens being cemented together, a fourth lens component L4 of positive refractive power comprising a biconcave lens and a biconvex lens cemented together and having its convex surface facing the image side as a whole, and a fifth lens component L5 which is a negative meniscus lens having its convex surface facing the image side, a stop S being disposed between the third lens component L3 and the fourth lens component L4.

The numerical data of the thirteenth embodiment of the present invention are given below. In the data Table below, the numbers at the left end represents the order from the object side, r represents the radius of curvature of each lens surface, d represents the spacing between adjacent lens surfaces, and the refractive index n and Abbe number ν are values for d-line (λ=587.6 nm).

TABLE 17

Numerical Data of the Thirteenth Embodiment
f = 28.9
$F_{NO} = 2.88$
2ω = 73.8°

|   | r | d | n | υ |
|---|---|---|---|---|
| 1 | 11.8420 | 1.500 | 1.59507 | 36.6 |
| 2 | 8.4410 | 2.998 | | |
| 3 | 10.9528 | 3.300 | 1.79668 | 27.8 |
| 4 | 15.7309 | 1.354 | | |
| 5 | −449.9259 | 1.000 | 1.67270 | 40.5 |
| 6 | 13.7678 | 2.500 | 1.80411 | 46.3 |
| 7 | −117.2633 | (d7) | | |
| 8 | ∞ | 2.650 | (stop) | |
| 9 | −24.4051 | 1.000 | 1.64831 | 38.4 |
| 10 | 5.0605 | 2.973 | 1.84042 | 29.2 |
| 11 | −12.1107 | 1.674 | | |
| 12 | −8.8483 | 1.500 | 1.59507 | 36.6 |
| 13 | −18.9952 | (Bf) | | |

Variations in the spacing when the photographing distance is infinity (∞) and a short distance (300 mm) are shown below.

TABLE 18

| Photographing Distance | Infinity | 300 mm |
|---|---|---|
| d7 | 1.350 | 1.492 |
| Bf | 18.460 | 21.287 |

The condition-corresponding values of the above data are shown below.

$$\Delta \cdot (\phi_a - \phi_b)/\phi = 0.012 \quad (1)$$

$$|\phi 1/\phi| = 0.489 \quad (2)$$

By using popular aspherical lenses in the ninth to thirteenth embodiments of the present invention, introducing an aspherical surface into the first lens component L1 or the fifth lens component L5, it is possible to correct astigmatism and curvature of image field better and achieve a wider angle. By introducing an aspherical surface also into the second lens component L2, the third lens component L3, or the fourth lens component L4, it is of course possible to correct spherical aberration further and achieve a greater aperture.

According to the present invention, there can be achieved a wide-angle lens which is compact and high in performance and as small as the order of F 2.8. The present invention can be used not only in 35 mm format cameras, but also in large format cameras. Further, when focusing is effected by general axial movement, the fluctuations of aberrations are very small and a good performance can be obtained.

What is claimed is:

1. A wide-angle objective lens system comprising, in order from an object side:

a first lens component including a negative meniscus single lens having a convex surface facing the object side;

a meniscus-shaped second lens component having positive refractive power and having a convex surface facing the object side;

a stop;

a third lens component including a cemented meniscus lens having positive refractive power, having a positive lens and a negative lens cemented together, and having a convex surface facing the object side;

a fourth lens component including a positive meniscus single lens having a concave surface facing the object side; and a fifth lens component including a negative meniscus single lens having a concave surface facing the object side, said lens system satisfying at least one of the following conditions:

$$0.02 \leq |t_1/f_1| \leq 0.1$$

$$0.01 \leq |t_4/f_5| \leq 0.08$$

$$-0.85 \leq (r_{32}+r_{41})/(r_{32}-r_{41}) \leq 0.90$$

where $t_1$: an air space on an optical axis of the lens system between a surface of the first lens component which is nearest to an image side and a surface of the second lens component which is nearest to the object side, $f_1$: the focal length of the first lens component, $t_4$: an air space on said optical axis between a surface of the fourth lens component which is nearest to the image side and a surface of the fifth lens component which is nearest to the object side, $f_5$: the focal length of the fifth lens component, $r_{32}$: the radius of curvature of a surface of the third lens component which is nearest to the image side, $r_{41}$: the radius of curvature of a surface of the fourth lens component which is nearest to the object side.

2. A wide-angle objective lens system according to claim 1, wherein said fourth lens component and the total thickness of the lens system satisfy the following conditions:

$$0.20 \leq |r_{42}/f| \leq 0.55$$

$$0.40 \leq D/f \leq 1.00$$

where f: the focal length of the entire lens system, $r_{42}$: the radius of curvature of a surface of the fourth lens component which is nearest to the image side, D: the total thickness of the lens system.

3. A wide-angle objective lens system according to claim 1, wherein said first lens component, said third lens component and said fifth lens component satisfy the following conditions:

$$0.04 < N_{31} - N_{=21}\ 0.25$$

$$N_1 < 1.70$$

$$N_5 < 1.70$$

where $N_{31}$: the refractive index of the positive lens of the third lens component for d-line, $N_{32}$: the refractive index of the negative lens of third lens component for d-line, $N_1$: the refractive index of the first lens component for d-line, $N_5$: the refractive index of the fifth lens component for d-line.

4. A wide-angle objective lens system according to claim 1, wherein said second lens component and said third lens component each include a cemented meniscus lens having a biconvex lens and a biconcave lens cemented together and having a convex surface facing the object side, said stop being disposed in the air space between said biconcave lens in said second lens component and said biconvex lens in said third lens component.

5. A wide-angle objective lens system according to claim 1, wherein said second lens component includes a positive meniscus single lens having a convex surface facing the object side, said third lens component includes a cemented meniscus lens having a biconvex lens and a biconcave lens cemented together and having a convex surface facing the object side, and said stop is disposed in the air space between said positive meniscus single lens in said second lens component and said biconvex lens in said third lens component.

6. A wide-angle objective lens system according to claim 1, which is designed in accordance with the following data:

| | F = 28.9 $F_{NO}$ = 2.88 $2\omega$ = 73.8° | | | |
|---|---|---|---|---|
| | r | d | n | υ |
| 1 | 17.100 | 1.50 | 1.54739 | 53.5 |
| 2 | 9.282 | 2.70 | | |
| 3 | 12.910 | 3.90 | 1.84042 | 43.3 |
| 4 | −60.183 | 1.10 | 1.62588 | 35.7 |
| 5 | 14.650 | 5.00 | | |
| 6 | 50.105 | 3.30 | 1.79668 | 45.4 |
| 7 | −10.659 | 1.00 | 1.67270 | 32.2 |
| 8 | 43.956 | 1.40 | | |
| 9 | −36.842 | 3.00 | 1.79668 | 45.4 |
| 10 | 13.025 | 1.50 | | |
| 11 | −9.805 | 1.50 | 1.58144 | 40.8 |
| 12 | −14.846 | 20.83 | | |
| (1) $|t_1/f_1|$ = 0.068 | | | | |
| (2) $|t_4/f_5|$ = 0.027 | | | | |
| (3) $(r_{32} + r_{41})/(r_{32} - r_{41})$ = 0.088 | | | | |
| (4) $|r_{42}/f|$ = 0.451 | | | | |
| (5) D/f = 0.897 | | | | |
| (6) $N_{31} - N_{32}$ = 0.123 | | | | |
| (7) $N_1$ = 1.547 | | | | |
| (8) $N_5$ = 1.581 | | | | | where f represents the focal length, $F_{NO}$ represents the F-number, $2\omega$ represents the angle of view, the numbers at the left end represent the order from the object side, r represents the radius of curvature of each lens surface, d represents the spacing between adjacent lens surfaces, and n and ν represent the refractive index and Abbe number, respectively, for d-line ($\lambda$=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

7. A wide-angle objective lens system according to claim 1, which is designed in accordance with the following data:

| f = 28.9 | | | |
|---|---|---|---|
| $F_{NO}$ = 2.87 | | | |
| 2ω = 73.0° | | | |
| r | d | n | υ |
| 1  12.475 | 1.50 | 1.57501 | 41.6 |
| 2  8.882 | 3.10 | | |
| 3  12.551 | 4.40 | 1.84042 | 43.3 |
| 4  −1631.732 | 1.00 | 1.64831 | 33.8 |
| 5  12.856 | 4.00 | | |
| 6  43.791 | 2.50 | 1.79668 | 45.4 |
| 7  −13.768 | 1.00 | 1.67270 | 32.2 |
| 8  77.172 | 1.10 | | |
| 9  −25.300 | 2.70 | 1.79668 | 45.4 |
| 10  −10.647 | 1.00 | | |
| 11  −8.993 | 1.50 | 1.58144 | 40.8 |
| 12  −17.685 | 20.51 | | |

(1) $|t_1/f_1| = 0.051$
(2) $|t_4/f_5| = 0.024$
(3) $(r_{32}+r_{41})/(r_{32}-r_{41}) = 0.506$
(4) $|r_{42}/f| = 0.369$
(5) $D/f = 0.824$
(6) $N_{31} - N_{32} = 0.056$
(7) $N_1 = 1.532$
(8) $N_5 = 1.581$ where f represents the focal length, $F_{NO}$ represents the F-number, 2ω represents the angle of view, the numbers at the left end represent the order from the object side, r represents the radius of curvature of each lens surface, d represents the spacing between adjacent lens surfaces, and n and ν represent the refractive index and Abbe number, respectively, for d-line (λ=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

8. A wide-angle objective lens system according to claim 1, which is designed in accordance with the following data:

| f = 28.9 | | | |
|---|---|---|---|
| $F_{NO}$ = 2.87 | | | |
| 2ω = 74.0° | | | |
| r | d | n | υ |
| 1  12.422 | 1.50 | 1.53172 | 49.1 |
| 2  8.919 | 3.37 | | |
| 3  12.829 | 3.87 | 1.84042 | 43.3 |
| 4  −1726.972 | 1.00 | 1.64831 | 33.8 |
| 5  12.785 | 4.00 | | |
| 6  51.931 | 2.50 | 1.81600 | 46.8 |
| 7  −17.040 | 1.00 | 1.61750 | 30.8 |
| 8  54.857 | 1.31 | | |
| 9  −21.730 | 2.95 | 1.79668 | 45.4 |
| 10  −10.479 | 0.80 | | |
| 11  −8.874 | 1.50 | 1.59507 | 35.5 |
| 12  −13.780 | 20.96 | | |

(1) $|t_1/f_1| = 0.048$
(2) $|t_4/f_5| = 0.017$
(3) $(r_{32}+r_{41})/(r_{32}-r_{41}) = 0.433$
(4) $|r_{42}/f| = 0.363$
(5) $D/f = 0.824$
(6) $N_{31} - N_{32} = 0.199$
(7) $N_1 = 1.532$
(8) $N_5 = 1.595$ where f represents the focal length, $F_{NO}$ represents the F-number, 2ω represents the angle of view, the numbers at the left end represent the order from the object side, r represents the radius of curvature of each lens surface, d represents the spacing between adjacent lens surfaces, and n and ν represent the refractive index and Abbe number, respectively, for d-line (λ=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

9. A wide-angle objective lens system according to claim 1, which is designed in accordance with the following data:

| f = 28.9 | | | |
|---|---|---|---|
| $F_{NO}$ = 2.87 | | | |
| 2ω = 73.4° | | | |
| r | d | n | υ |
| 1  18.080 | 1.50 | 1.56384 | 60.9 |
| 2  9.401 | 3.26 | | |
| 3  13.713 | 4.18 | 1.80218 | 44.7 |
| 4  −28.737 | 1.10 | 1.61293 | 37.0 |
| 5  17.068 | 5.00 | | |
| 6  48.775 | 3.14 | 1.80218 | 44.7 |
| 7  −11.832 | 1.00 | 1.68893 | 31.1 |
| 8  38.220 | 1.22 | | |
| 9  −40.592 | 3.30 | 1.79668 | 45.4 |
| 10  −12.910 | 1.60 | | |
| 11  −9.672 | 2.00 | 1.58144 | 40.8 |
| 12  −13.780 | 20.96 | | |

(1) $|t_1/f_1| = 0.088$
(2) $|t_4/f_5| = 0.028$
(3) $(r_{32}+r_{41})/(r_{32}-r_{41}) = -0.030$
(4) $|r_{42}/f| = 0.447$
(5) $D/f = 0.945$
(6) $N_{31} - N_{32} = 0.113$
(7) $N_1 = 1.564$
(8) $N_5 = 1.582$ where f represents the focal length, $F_{NO}$ represents the F-number, 2ω represents the angle of view, the numbers at the left end represent the order from the object side, r represents the radius of curvature of each lens surface, d represents the spacing between adjacent lens surfaces, and n and ν represent the refractive index and Abbe number, respectively, for d-line (λ=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

10. A wide-angle objective lens system according to claim 1, which is designed in accordance with the following data:

| | f = 35.0<br>$F_{NO}$ = 2.80<br>$2\omega$ = 62.4° | | | |
|---|---|---|---|---|
| | r | d | n | $\nu$ |
| 1 | 13.804 | 1.40 | 1.67025 | 57.6 |
| 2 | 9.560 | 2.50 | | |
| 3 | 11.800 | 4.20 | 1.79668 | 43.3 |
| 4 | −1901.932 | 1.20 | 1.68893 | 31.2 |
| 5 | 12.250 | 5.75 | | |
| 6 | 23.817 | 3.30 | 1.72000 | 50.3 |
| 7 | −12.861 | 1.20 | 1.62588 | 35.6 |
| 8 | 23.478 | 1.25 | | |
| 9 | −92.286 | 3.20 | 1.79631 | 40.9 |
| 10 | −13.150 | 1.00 | | |
| 11 | −10.885 | 1.40 | 1.67003 | 47.1 |
| 12 | −26.314 | 22.10 | | |

(1) $|t_1/f_1| = 0.047$
(2) $|t_4/f_5| = 0.035$
(3) $(r_{32}+r_{41})/(r_{32}-r_{41}) = -0.595$
(4) $|r_{42}/f| = 0.376$
(5) $D/f = 0.747$
(6) $N_{31} - N_{32} = 0.094$
(7) $N_1 = 1.670$
(8) $N_5 = 1.670$ where f represents the focal length, $F_{NO}$ represents the F-number, $2\omega$ represents the angle of view, the numbers at the left end represent the order from the object side, r represents the radius of curvature of each lens surface, d represents the spacing between adjacent lens surfaces, and n and $\nu$ represent the refractive index and Abbe number, respectively, for d-line ($\lambda$=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

11. A wide-angle objective lens system according to claim 1, which is designed in accordance with the following data:

| | f = 35.0<br>$F_{NO}$ = 2.80<br>$2\omega$ = 62.4° | | | |
|---|---|---|---|---|
| | r | d | n | $\nu$ |
| 1 | 15.140 | 1.40 | 1.51680 | 64.1 |
| 2 | 9.852 | 2.60 | | |
| 3 | 13.541 | 4.20 | 1.79668 | 45.4 |
| 4 | −1960.755 | 1.20 | 1.67270 | 32.1 |
| 5 | 16.374 | 5.75 | | |
| 6 | 38.906 | 4.20 | 1.79668 | 45.4 |
| 7 | −9.900 | 1.20 | 1.67270 | 32.1 |
| 8 | 39.474 | 1.40 | | |
| 9 | −56.315 | 3.00 | 1.74950 | 35.2 |
| 10 | −15.623 | 2.30 | | |
| 11 | −10.487 | 1.40 | 1.53172 | 49.1 |
| 12 | −22.411 | 20.87 | | |

(1) $|t_1/f_1| = 0.043$
(2) $|t_4/f_5| = 0.060$
(3) $(r_{32}+r_{41})/(r_{32}-r_{41}) = -0.176$
(4) $|r_{42}/f| = 0.446$
(5) $D/f = 0.819$
(6) $N_{31} - N_{32} = 0.124$
(7) $N_1 = 1.517$
(8) $N_5 = 1.532$ where f represents the focal length, $F_{NO}$ represents the F-number, $2\omega$ represents the angle of view, the numbers at the left end represent the order from the object side, r represents the radius of curvature of each lens surface, d represents the spacing between adjacent lens surfaces, and n and $\nu$ represent the refractive index and Abbe number, respectively, for d-line ($\lambda$=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

12. A wide-angle objective lens system according to claim 1, which is designed in accordance with the following data:

| | f = 35.0<br>$F_{NO}$ = 2.80<br>$2\omega$ = 62.6° | | | |
|---|---|---|---|---|
| | r | d | n | $\nu$ |
| 1 | 11.026 | 1.50 | 1.57501 | 41.6 |
| 2 | 8.859 | 3.28 | | |
| 3 | 14.478 | 4.60 | 1.84042 | 43.3 |
| 4 | −226.717 | 1.00 | 1.64831 | 33.8 |
| 5 | 13.585 | 4.00 | | |
| 6 | 78.289 | 2.50 | 1.80411 | 46.4 |
| 7 | −13.768 | 1.00 | 1.67270 | 32.2 |
| 8 | 100.000 | 1.15 | | |
| 9 | −20.464 | 2.95 | 1.79668 | 45.4 |
| 10 | −10.474 | 0.80 | | |
| 11 | −9.468 | 1.50 | 1.58267 | 46.5 |
| 12 | −16.567 | 25.07 | | |

(1) $|t_1/f_1| = 0.031$
(2) $|t_4/f_5| = 0.019$
(3) $(r_{32}+r_{41})/(r_{32}-r_{41}) = 0.660$
(4) $|r_{42}/f| = 0.299$
(5) $D/f = 0.694$
(6) $N_{31} - N_{32} = 0.131$
(7) $N_1 = 1.575$
(8) $N_5 = 1.583$ where f represents the focal length, $F_{NO}$ represents the F-number, $2\omega$ represents the angle of view, the numbers at the left end represent the order from the object side, r represents the radius of curvature of each lens surface, d represents the spacing between adjacent lens surfaces, and n and ν represent the refractive index and Abbe number, respectively, for d-line (λ=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

13. A wide-angle objective lens system according to claim 1, which is designed in accordance with the following data:

| | f = 28.9 $F_{NO}$ = 2.88 2ω = 73.8° | | | |
|---|---|---|---|---|
| | r | d | n | ν |
| 1 | 14.953 | 1.50 | 1.59507 | 35.5 |
| 2 | 8.621 | 2.94 | | |
| 3 | 10.597 | 3.76 | 1.80411 | 46.4 |
| 4 | 17.712 | 5.00 | | |
| 5 | 24.439 | 2.50 | 1.79668 | 45.4 |
| 6 | −12.240 | 1.00 | 1.67270 | 32.2 |
| 7 | 25.235 | 1.10 | | |
| 8 | −49.274 | 2.90 | 1.79631 | 40.9 |
| 9 | −11.514 | 1.00 | | |
| 10 | −8.160 | 1.50 | 1.58144 | 40.8 |
| 11 | −21.421 | 19.32 | | |

(1) $| t_1 / f_1 | = 0.078$
(2) $| t_4 / f_5 | = 0.042$
(3) $(r_{32} + r_{41}) / (r_{32} - r_{41}) = -0.323$
(4) $| r_{42} / f | = 0.399$
(5) $D / f = 0.803$
(6) $N_{31} - N_{32} = 0.124$
(7) $N_1 = 1.595$
(8) $N_5 = 1.581$ where f represents the focal length, $F_{NO}$ represents the F-number, 2ω represents the angle of view, the numbers at the left end represent the order from the object side, r represents the radius of curvature of each lens surface, d represents the spacing between adjacent lens surfaces, and n and ν represent the refractive index and Abbe number, respectively, for d-line (λ=587.6 nm), $r_{42}$: the radius of curvature of a surface of the fourth lens component which is nearest to the image side, D: the total thickness of the lens system, $N_{31}$: the refractive index of the positive lens of the third lens component for d-line, $N_{32}$: the refractive index of the negative lens of the third lens component for d-line, $N_1$: the refractive index of the first lens component for d-line, $N_5$: the refractive index of the fifth lens component for d-line.

14. A wide-angle objective lens comprising, in order from an object side:

a first lens component including a negative meniscus lens having a convex surface facing the object side;

a second lens component having a convex surface facing the object side and having positive refractive power;

a third lens component which is a cemented lens having positive refractive power, the cemented lens consisting of, in order from the object side, a positive lens and a negative lens;

a fourth lens component having a convex surface facing an image side and having positive refractive power; and a fifth lens component including a negative meniscus lens having a convex surface facing the image side, said wide-angle objective lens system satisfying the following condition:

$$0.04 < N_{31} - N_{32} < 0.25$$

where $N_{31}$: the refractive index of the positive lens of the third lens component for d-line;

$N_{32}$: the refractive index of the negative lens of the third lens component for d-line.

15. A wide-angle objective lens system according to claim 14, wherein a stop is disposed between said second lens component and said third lens component, and said wide-angle objective lens satisfies the following condition:

$$-0.85 \leq (r_{32} + r_{41})/(r_{32} - r_{41}) \leq 0.90$$

where $r_{32}$: the radius of curvature of a surface of the third lens component which is nearest to the image side;

$r_{41}$: the radius of curvature of a surface of the fourth lens component which is nearest to the object side.

16. A wide-angle objective lens system according to claim 14, wherein, when the total thickness of the lens system is D and the focal length of the whole lens system is f, said wide-angle objective lens satisfies the following condition:

$$0.4 < D/f \leq 1.0.$$

17. A wide-angle objective lens system according to claim 14, wherein a stop is disposed between said second lens component and said third lens component and, when focusing is performed, a lens unit disposed on the object side of the stop and a lens unit disposed on the image side of the stop are designed so as to move different distances on the optical axis.

18. A wide-angle objective lens system comprising, in order from an object side:

a first lens unit including, in order from the object side, a first lens component having negative refractive power and a second lens component having positive refractive power;

a stop; and a second lens unit having positive refractive power, said first lens unit and said second lens unit moving different distances on an optical axis of the lens system when moved toward the object side during focusing.

19. A wide-angle objective lens system according to claim 18, satisfying the following condition:

$$0 < \Delta \cdot \phi / (\phi_a - \phi_b) < 0.2$$

where $\phi_a$: the refractive power of said first lens unit, $\phi_b$: the refractive power of said second lens unit, $\phi$: the refractive power of the whole lens system, Δ: an amount defined by the following equation:

$$\Delta = (\delta_1 - \delta_2)/\delta_2$$

when the amount of movement of the first lens unit during focusing is δ1 and the amount of movement of the second lens unit during focusing is δ2.

20. A wide-angle objective lens system according to claim 19, wherein, when the refractive power of said first lens component is φ1 and the refractive power of the whole lens system is φ, said wide-angle objective lens satisfies the following condition:

$0.3 < |\phi 1/\phi| < 0.95.$

21. A wide-angle objective lens system according to claim 18, wherein said second lens unit has a negative lens component nearest to the image side.

22. A wide-angle objective lens system according to claim 18, wherein, when the total thickness of the lens system is D and the focal length of the whole lens system is f, said wide-angle objective lens system satisfies the following condition:

$0.4 < D/f \leq 1.0.$

* * * * *